UNITED STATES PATENT OFFICE.

WILLIAM COURTENAY, OF NEW YORK, N. Y.

IMPROVEMENT IN MAKING HOLLOW ARTICLES OF VULCANIZED FIBER.

Specification forming part of Letters Patent No. 193,322, dated July 24, 1877; application filed May 18, 1877.

*To all whom it may concern:*

Be it known that I, WILLIAM COURTENAY, of the city, county, and State of New York, have invented a new and Improved Art of Manufacturing Tubular Articles of Vulcanized Fiber, of which the following is a specification:

Vulcanized fiber is a newly-discovered substance, but now well-known in the arts, consisting of vegetable fiber treated with chloride of zinc, or its equivalent, in the manner described in Letters Patent of the United States No. 113,454, dated April 4, 1871, and No. 120,380, dated October 31, 1871, the result of which treatment is the production of the material in sheets of any desired dimensions.

As this material is strong, tough, elastic, very durable, capable of resisting the action of oils and acids, and of being rendered impervious to moisture, and also of being colored or ornamented to any desired extent, it possesses a wide range of utility in the arts.

The object of my improvement is to make tubular article of this substance, such as baskets, measures, drum-shells, roving-cans, and other vessels.

To carry out the object of my invention I take sheets of vulcanized fiber, chamfer the edges to be joined, and partially dissolve said edges by immersing them in a bath of chloride of zinc. The tube is then formed upon a mandrel of suitable size, and its edges cemented together by heat and pressure, the edges being held together by any suitable clamp and the heat applied in well-known ways. The tubes are then soaked in water until the chloride of zinc is extracted. The tube while wet is then slipped upon a mandrel, and allowed to dry gradually. This mandrel is made in sections, so as to be collapsible in order to facilitate its removal, which construction is necessary, as the tube in drying shrinks very tightly upon the mandrel.

The mandrel may be of any form desired, such as circular, square, or polygonal, the tube readily assuming the shape of the mandrel in shrinking upon it.

While the tube is still wet its edges can be turned over a wire or loop, or a band of vulcanized fiber, thus forming a flange or bead, which also shrinks and hardens in drying, thus very materially strengthening the ends, as well as imparting an ornamental appearance to the tube.

What I claim as my invention, and desire to secure by Letters Patent, is—

The improved art, hereinbefore set forth, of forming tubular articles from vulcanized fiber, which consists in partially dissolving the edges of the material in chloride of zinc, forming it upon a mandrel, cementing the edges under heat and pressure, wetting, and shrinking upon a mold to impart the desired contour to the tube while drying.

In testimony whereof I have hereunto subscribed my name.

W. COURTENAY.

Witnesses:
 FRANCIS P. BURKE,
 GEO. WAGNER.